(12) United States Patent
Imamura et al.

(10) Patent No.: US 6,915,517 B1
(45) Date of Patent: Jul. 5, 2005

(54) DIGITAL SIGNAL PROCESSOR

(75) Inventors: Yasushi Imamura, Ehime (JP); Takao Inoue, Ehime (JP); Masaaki Okita, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 664 days.

(21) Appl. No.: 09/786,482

(22) PCT Filed: Jul. 5, 2000

(86) PCT No.: PCT/JP00/04475

§ 371 (c)(1),
(2), (4) Date: Mar. 6, 2001

(87) PCT Pub. No.: WO01/02957

PCT Pub. Date: Jan. 11, 2001

(30) Foreign Application Priority Data

Jul. 6, 1999 (JP) .......................................... 11-191143

(51) Int. Cl.[7] .............................................. G06F 9/46
(52) U.S. Cl. ........................ 718/103; 712/35; 712/228
(58) Field of Search ................................. 718/100, 103, 718/102; 712/35, 228, 34, 229

(56) References Cited

U.S. PATENT DOCUMENTS

| | | | |
|---|---|---|---|
| 5,291,614 A | * 3/1994 | Baker et al. .................. | 712/35 |
| 5,363,506 A | 11/1994 | Fukuoka | |
| 5,442,789 A | * 8/1995 | Baker et al. ................. | 718/105 |
| 5,640,563 A | * 6/1997 | Carmon ....................... | 718/102 |
| 6,301,603 B1 | * 10/2001 | Maher et al. ................ | 718/105 |
| 2002/0062435 A1 | * 5/2002 | Nemirovsky et al. .......... | 712/7 |
| 2002/0083253 A1 | * 6/2002 | Leijten et al. ............... | 710/260 |

FOREIGN PATENT DOCUMENTS

| | | |
|---|---|---|
| JP | 51-65847 | 6/1976 |
| JP | 56-7146 | 1/1981 |
| JP | 58-97652 | 7/1983 |
| JP | 59-99553 | 6/1984 |
| JP | 3-15945 | 1/1991 |
| JP | 4-74229 | 3/1992 |
| JP | 5-20097 | 1/1993 |
| JP | 5-81041 | 4/1993 |
| JP | 63-654 | 1/1998 |
| JP | 10-27420 | 1/1998 |
| JP | 10-105413 | 4/1998 |
| JP | 10-255283 | 9/1998 |
| WO | WO 9722927 A1 * 6/1997 | .............. G06F/9/46 |

OTHER PUBLICATIONS

Fisher, Joseph R. "The SPS–41and SPS–81 Programmable Digital Signal Processors." ACM. 1973.*

National Technical Report, vol. 34, No. 6 (Japan), Kabushiki Kaisha Matsushita Techno Research, (Dec. 18, 1988), pp. 600–609; p. 601, right column to p. 602, right column.

* cited by examiner

*Primary Examiner*—Lewis A. Bullock, Jr.
(74) *Attorney, Agent, or Firm*—Wenderoth, Lind & Ponack, L.L.P.

(57) ABSTRACT

A digital signal processor comprises an arithmetic device 12 wherein a reservation processing register 26, to which setting to which from the arithmetic device 11 is possible and which has a construction for storing an address and an execution mode as a task list 18, and a clear circuit 27 for clearing the execution mode when the address in the reservation processing register 26 is copied to a program counter 21, are newly added.

Threreby, in the digital signal processor comprising two arithmetic devices, it is possible to remove the processing waiting time as well as to change the processing order at respective arithmetic devices.

3 Claims, 9 Drawing Sheets

DIGITAL SIGNAL PROCESSOR

TECHNICAL FIELD

The present invention relates to a digital signal processor and, more particularly, to one that shows an effect when applied to a servo control of an optical disk apparatus.

BACKGROUND ART

FIG. 9 is a diagram illustrating the construction of a servo control device in a conventional optical disk apparatus.

In this optical disk apparatus, a reflected light of a laser beam, which faced on the disk recording surface through a field lens 93 installed in an optical pickup 92 and which is emitted, is employed so as to read out data recorded in an optical disk 91. The quantity of light of the reflected light detected by employing a sensor such as a photo detector 94 is converted from analog data to digital data by an A/D converter 95 and is inputted to a digital signal processor 96. While the quantity of light of the reflected light detected varies in amounts that are influenced by the disk rotations, external vibrations, or the like, the quantity of light of the reflected light has to be kept at a large value so as to read out data correctly. To realize the same, it is necessary to perform a focus control and a tracking control.

The focus control is to control the field lens against the surface deflection of the disk so that a distance between the field lens 93 installed in the optical pickup and the disk recording surface should be kept constant and that the disk recording surface should be located within the depth of focus of the laser. The tracking control is one that controls the field lens 93 against decentering of the disk so that the optical spot should scan on the track correctly. The focus control and the tracking control are realized by detecting a focus error signal and a tracking error signal which respectively represent whether or not focusing and tracking are performed correctly from the reflected light, calculating a focus driving amount and a tracking driving amount by digital operations, and driving the field lens 93 by signals passing through D/A converters 97C and 97D, respectively. As servo controls required for the optical disk apparatus, there are a spindle control which controls a spindle motor 98 for rotating the optical disk, a traverse control for driving the optical pickup 92, and the like, other than the focus control and the tracking control.

As a construction of the digital signal processor which performs the servo control in a conventional optical disk apparatus, there is a method disclosed in Japanese Published Patent Application No. Hei. 10-255283, entitled as "A control method of an optical pickup and an optical disk apparatus". In this prior official report, there is disclosed the construction of a servo system in the optical disk device having a CPU as a main arithmetic device and a DSP as an auxiliary arithmetic device which supplements the CPU, and a system in which various tasks required for the servo control of the optical device are processed in the CPU and the DSP divisionally.

Hereinafter, a conventional digital signal processor which comprises two arithmetic devices and performs a servo control in the optical disk apparatus will be described with reference to FIG. 7.

In FIG. 7, reference numerals 11 and 12 denote arithmetic devices, numeral 13 denotes an external bus, numerals 14 and 16 denote program memory areas, numerals 15 and 17 denote arithmetic logic units "ALU", numeral 18 denotes a task list, numeral 19 denotes an external start-up factor, numeral 70 denotes a processing pointer A, numeral 21 denotes a program counter, numeral 22 denotes an instruction decoder, numeral 23 denotes a program halt notification signal, numeral 24 denotes a termination status storage register, and numeral 25 denotes a processing demand generation circuit.

The arithmetic device 11 and the arithmetic device 12 are connected each other by the external bus 13, and it is possible that the arithmetic device 11 should refer to the internal register of the arithmetic device 12. The arithmetic device 11 makes the arithmetic logic unit 15 activated by a program stored in the program memory area 14, and calculates driving values required for the spindle control, the traverse control, or the like. Similarly, the arithmetic device 12 also makes the arithmetic logic unit 17 operated by a program stored in the program memory area 16, and calculates driving values needed for the focus control, the tracking control, or the like.

For example, a processing A which is a focus control processing and a processing B which is a tracking control processing in the arithmetic device 12 are previously transferred from the arithmetic device 11 via the external bus 13 and are stored in the program memory area 16. Moreover, starting addresses of the processing A and the processing B are transferred from the arithmetic device 11 to the task list 18 which is established in the arithmetic device 12. The task list 18 stores the starting addresses of respective processings and execution modes of respective processings as a pair, respectively. The execution mode indicates whether the corresponding processing can be performed or not. When a high (hereinafter referred to as "Hi") pulse is inputted to the external start-up factor 19 which is generated at a constant period, the arithmetic device 12 is initialized so that the processing pointer A 70 should indicate the head of the task list 18. Further, 0 indicating no conclusion is set to the termination status storage device 24. In addition, the arithmetic device 12 copies the address stored in the task list 18 that is indicated by the processing pointer A 70 to the program counter 21. At this time, when the execution mode corresponding to the address indicated by the processing pointer A 70 indicates "0" meaning incapability of execution, the processing pointer is incremented by 1 and tries to copy the address of the following processing to the program counter 21.

According to the above-mentioned operation, the program of the processing A is activated and is read cut from the program memory area 16. Then, when the program of the processing A read out is interpreted by the instruction decoder 22, the arithmetic logic unit 17 is operated to perform the processing A.

When the program counter 21 reaches the termination address of the processing A and the program halt instruction is inputted to the instruction decoder 22, the arithmetic device 12 makes the instruction decoder 22 output the program halt notification signal 23 to the processing pointer A 70. When the program halt notification signal 23 is notified to the processing pointer A 70, the arithmetic device 12 changes the indication destination to the task list 18 from the processing A to the processing B and copies the starting address of the processing B to the program counter 21. Thereby, the program of the processing B is activated to perform the processing B. The arithmetic device 12 repeats similar operations for all processings stored in the task list 18, and sets 1 indicating the conclusion of the processings to the termination status storage register 24 when all the processings are concluded.

The arithmetic device 11 monitors the termination status storage register 24 of the arithmetic device 12, and when 0 indicating that the arithmetic device 12 is not under execution of the processing is set, the arithmetic device 11 can demand the arithmetic device 12 to execute a processing C which is not stored in the task list 18, employing the processing demand generation circuit 25.

According to the so-constructed digital signal processor of the optical disk apparatus, processings can be distributed such that the focus control and the tracking control which require high operating speeds are performed by the arithmetic device 12 while the spindle control and the traverse control which only require a low working speeds are performed by the arithmetic device 11, whereby the arithmetic device 11 can be realized by an inexpensive small sized circuit.

However, according to the construction of the above-described conventional digital signal processor, when the arithmetic device 11 demands that the arithmetic device 12 should execute the processing C, the arithmetic device 11 has to monitor the termination status storage register 24, thereby resulting in a processing waiting time for the processing of the arithmetic device 12 at the arithmetic device 11. For example, as shown in a timing chart in FIG. 8, when the execution demand for the processing C is generated from the arithmetic device 11 while the arithmetic device 12 is performing the processing A, the arithmetic device 11 has to be in a waiting state with monitoring the termination status storage register 24 until the arithmetic device 12 concludes the processing A and the processing B.

Further, the processing C, for which the processing is demanded from the arithmetic device 11, can not be performed after the arithmetic device 12 concluded the processing A and before it starts the processing B.

In addition, it is not possible to perform the processing C, for which the processing is demanded from the arithmetic device 11, with interrupting the processing A which is under execution by the arithmetic device 12.

The present invention is made to solve the above-mentioned problems and has for its object to provide a digital signal processor which can remove the waiting time at the arithmetic device 11 as well as can change the processing order at the arithmetic device 12.

DISCLOSURE OF INVENTION

According to a first aspect of the present invention, there is provided a digital signal processor comprising: a main arithmetic device which generates a task demand; an auxiliary arithmetic device which receives the task demand from the main arithmetic device and performs the task; the auxiliary arithmetic device being provided with a reservation processing register for setting a task from the main arithmetic device even when the auxiliary arithmetic device is performing a processing; a clear circuit for clearing the task stored in the reservation processing register after the task set in the reservation processing register is performed; and the task demanded from the main arithmetic device being performed after the auxiliary arithmetic device terminated the task which has just been under execution.

Thereby, it is possible to receive the task processing demand outputted from the main arithmetic device by the auxiliary arithmetic device, without putting the main arithmetic device in a waiting state, and to make the demanded task after terminating the processing of the task which B under execution performed by the auxiliary arithmetic device.

According to a second aspect of the present invention, in the digital signal processor as defined in the first aspect, the auxiliary arithmetic device has a priority judgment circuit for determining the priority for performing the processing of the task, for which the processing is demanded, to execute the processing, and the auxiliary arithmetic device performs the task in accordance with the priorities of respective tasks determined by the priority judgment circuit.

Thereby, it is possible to perform the task demanded from the main arithmetic device to the auxiliary arithmetic device in accordance with the determined priorities.

According to a third aspect of the present invention, in the digital signal processor as defined in the first aspect, the auxiliary arithmetic device has an interruption signal generation circuit for generating an interruption signal interrupting the processing which is under execution, and when receiving the task demand from the main arithmetic device, the auxiliary arithmetic device interrupts the processing and performs the task demanded from the main arithmetic device.

Thereby, it is possible to perform the task, for the processing is demanded from the main arithmetic device with no waiting time by the auxiliary arithmetic device.

BRIEF DIESCRIPTION OF DRAWINGS

BEST MODE TO EXECUTE THE INVENTION

Figure 1:
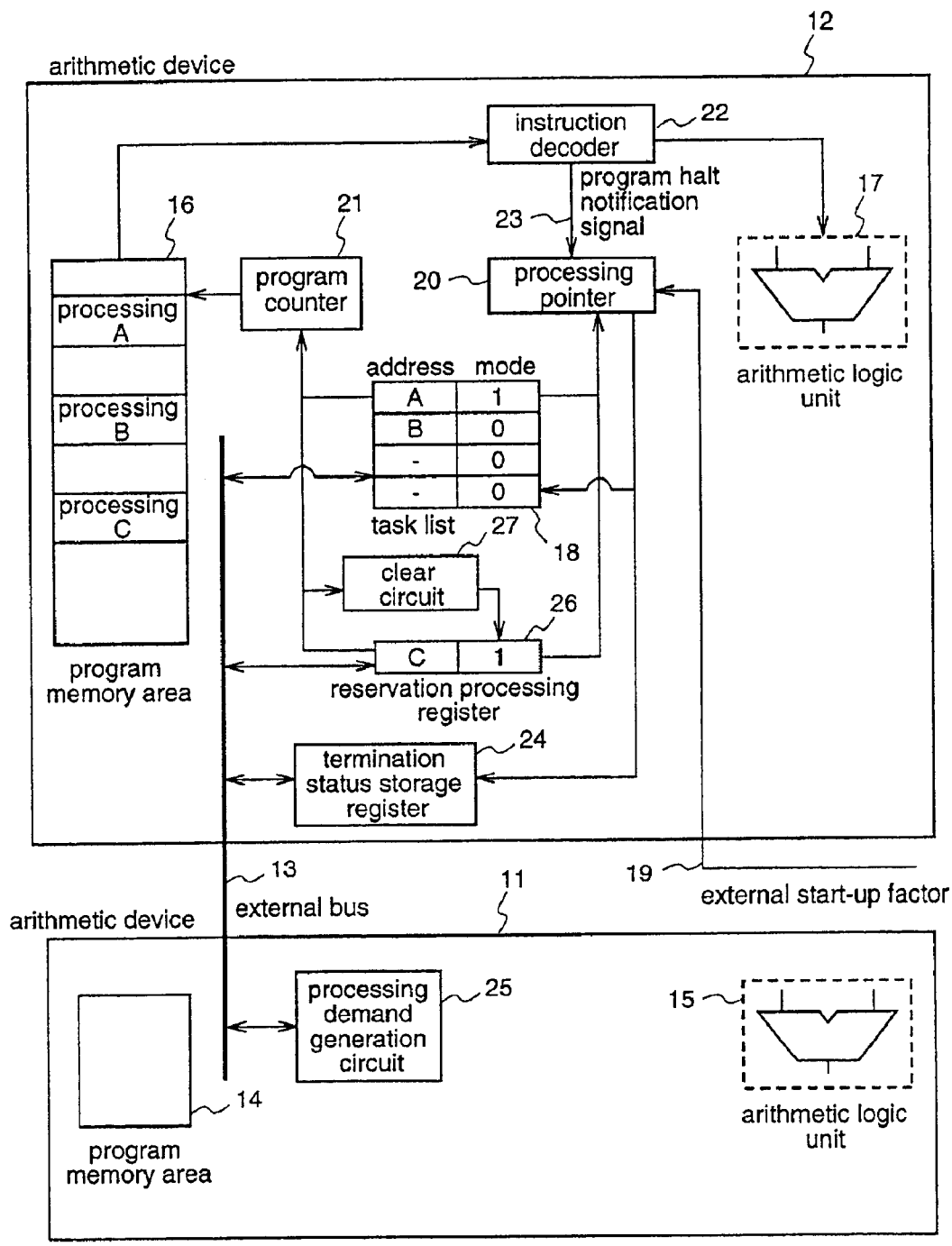
FIG. 1 is a block diagram illustrating the construction of a digital signal processor provided with a reservation processing register according to a first embodiment of the present invention.

Hereinafter, embodiments of the present invention will be described with reference to the drawings.
(Embodiment 1)
FIG. 1 is a block diagram illustrating the construction of a digital signal processor according to a first embodiment. In FIG. 1, reference numerals 11 and 12 denote arithmetic devices, numeral 13 denotes an external bus, numerals 14 and 16 denote program memory areas, numerals 15 and 17 denote arithmetic logic units, numeral 18 denotes a task list, numeral 19 denotes an external start-up factor, numeral 20 denotes a processing pointer, numeral 21 denotes a program counter, numeral 22 denotes an instruction decoder, numeral 23 denotes a program halt notification signal, numeral 24 denotes a termination status storage register, numeral 25 denotes a processing demand generation circuit, numeral 26 denotes a reserved processing register, and numeral 27 denotes a clear circuit.

Figure 7:
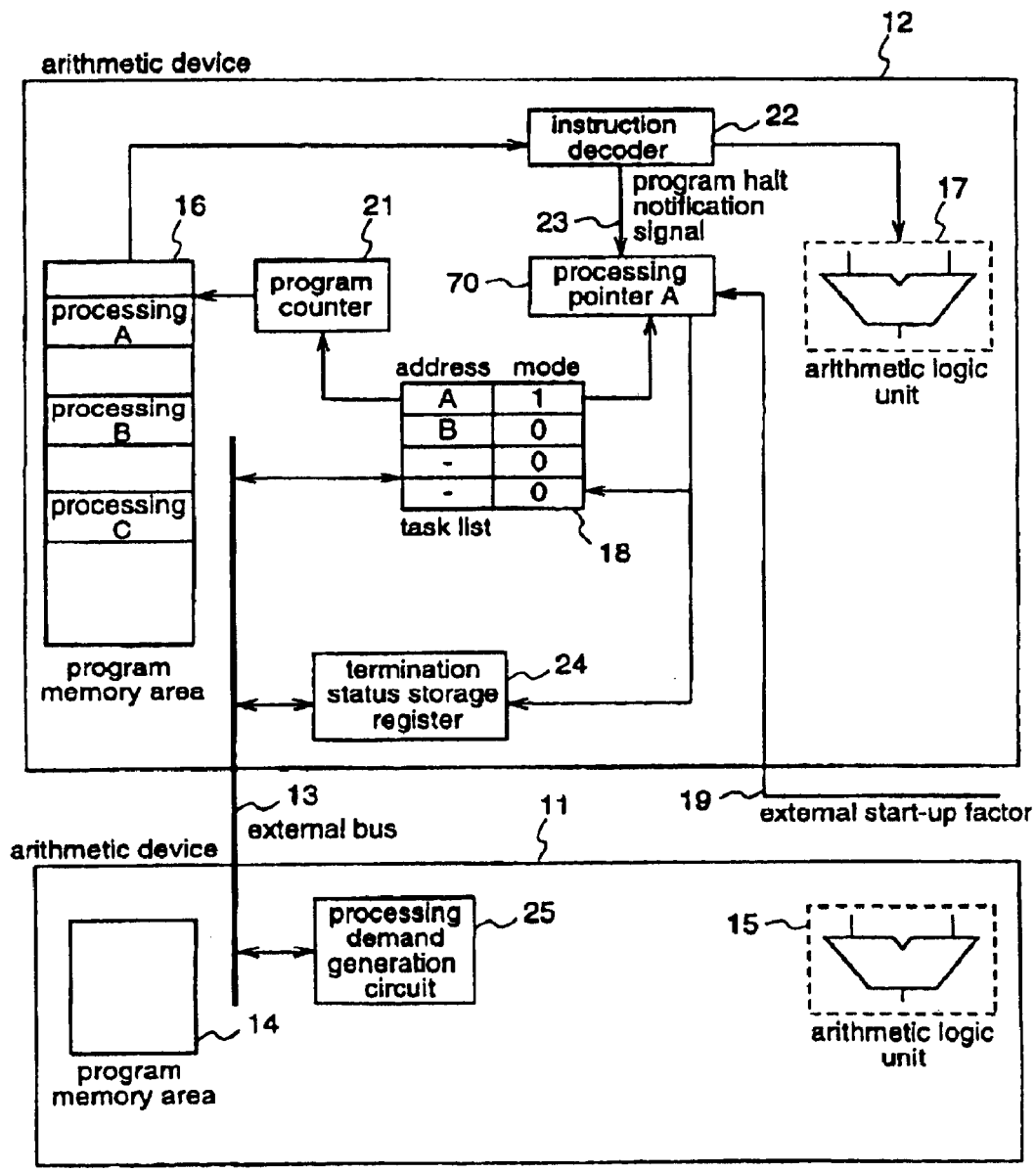
FIG. 7 is a block diagram showing the construction of a conventional digital signal processor.
Figure 8:
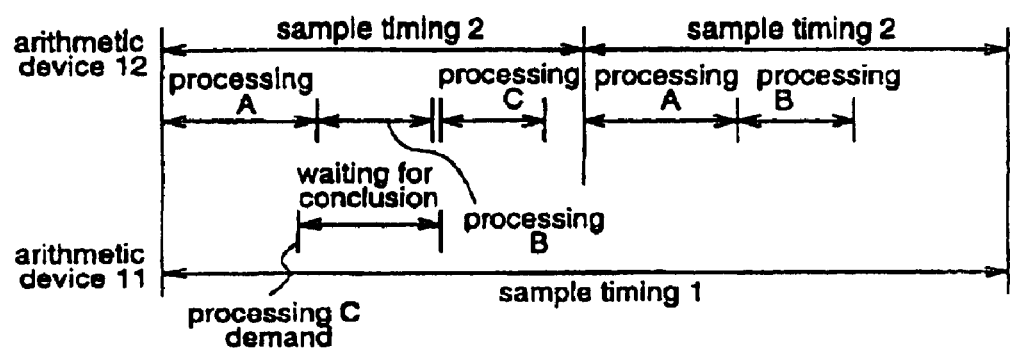
FIG. 8 is a timing chart of the conventional digital signal processor.
Figure 9:
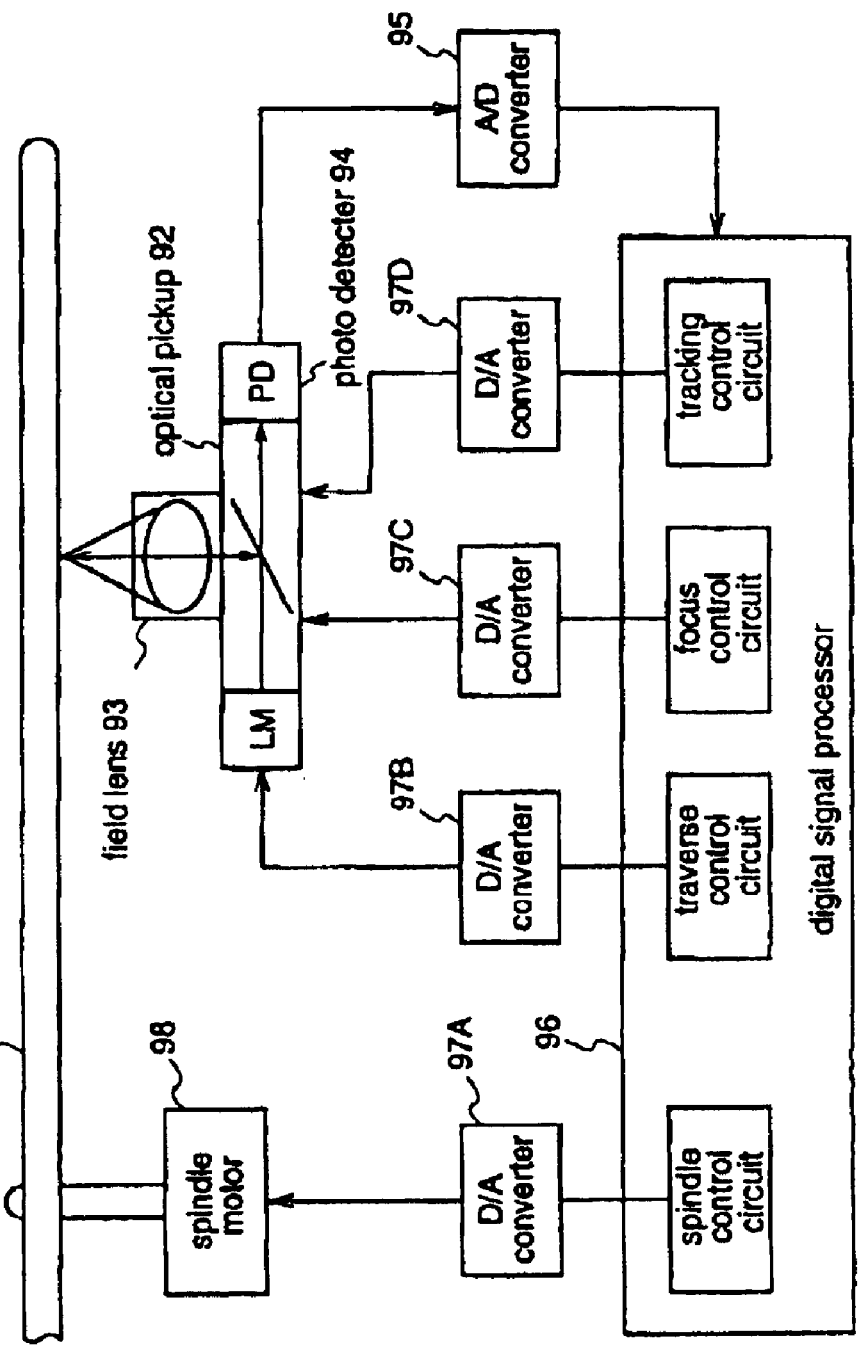
FIG. 9 is a constitutional diagram of a typical optical disk apparatus.

Similarly as the conventional construction shown in FIG. 7, the arithmetic device 11 and the arithmetic device 12 are connected to each other by the external bus 13, and the arithmetic device 11 can refer to the internal register of the arithmetic device 12. The arithmetic device 11 makes the arithmetic logic unit 15 operate in accordance with a program stored in the program memory area 14, to calculate driving values required for the spindle control, the traverse control, or the like. Similarly, the arithmetic device 12 also makes the arithmetic logic unit 17 operate in accordance with a program stored in the program memory area 16, to calculate driving values required for the focus control, the tracking control, or the like.

For example, a processing A which is a focus control processing and a processing B which is a tracking control processing in the arithmetic device 12 are previously transferred from the arithmetic device 11 via the external bus 13 and are stored in the program memory area 16. Moreover, starting addresses of the processing A and the processing B are transferred from the arithmetic device 11 to the task list 18 established in the arithmetic device 12. The task list 18 stores the starting addresses of respective processings and execution modes of respective processings as a pair, respectively. The execution mode indicates whether the corresponding processing can be performed or not. When a "Hi" pulse is inputted to the external start-up factor 19 which is generated at a constant period, the arithmetic device 12 initializes the processing pointer 20 so that it indicate the head of the task list 18. Further, "0" indicating no conclusion is set to the termination status storage device 24. In addition, the arithmetic device 12 copies the address stored in the task list 18 that is indicated by the processing pointer 20 to the program counter 21. At this time, when the execution mode corresponding to the address indicated by the processing pointer 20 indicates "0" meaning incapability of execution, the processing pointer 20 is incremented by "1" and attempts to copy the address of the following processing to the program counter 21.

By the above-described operation, the program of the processing A is activated and is read out from the program memory area 16. Then, when the program of the processing A read out is interpreted by the instruction decoder 22, the arithmetic logic unit 17 is operated to perform the processing A. When the program counter 21 reaches the termination address of the processing A and the program halt instruction is inputted to the instruction decoder 22, the arithmetic device 12 makes the instruction decoder 22 output the program halt notification signal 23 to the processing pointer 20. When the program halt notification signal 23 is notified to the processing pointer 20, the arithmetic device 12 changes the indication destination to the task list 18 from the processing A to the processing B and copies the starting address of the processing B to the program counter 21. Thereby, the program of the processing B is activated to perform the processing B.

The arithmetic device 12 repeats similar operations for all processings stored in the task list 18. When all the processings are terminated, while in the conventional method shown in FIG. 7, 1 indicating the conclusion of the processing was set to the termination status storage register 24, the digital signal processor according to the present invention examines the execution mode in the reservation processing register 26. If assumed that during when the arithmetic device 12 is performing the processing A or the processing B the address of the processing C is written into the address part of the reservation processing register 26 in the arithmetic device 12 from the arithmetic device 11 and further, "1" indicating capability of execution is written into the execution mode in the reservation processing register 26 during when the arithmetic device 12 is performing the processing A or the processing B, the arithmetic device 12 terminates all the processings stored in the task list 18 and examines the execution mode in the reservation processing register 26. Then, the arithmetic device 12 recognizes that "1" is stored in the execution mode in the reservation processing register 26 and copies the address in the reservation processing register 26 to the program counter 21. Thereby, the program of the processing C is activated and it is read out from the program memory area 16. Then, when the program of the processing C read out is interpreted by the instruction decoder 22, the arithmetic logic unit 17 is operated to perform the processing C. The clear circuit 27 detects that the address in the reservation processing register 26 is copied to the program counter 21, and sets "0" meaning incapability of execution to the execution mode in the reserved processing register 26. When the program counter 21 reaches the termination address of the processing C and the program halt instruction is inputted to the instruction decoder 22, the arithmetic device 12 makes the instruction decoder 22 output the program halt notification signal 23 to the processing pointer 20, and sets "1" indicating the termination of the processing to the termination status storage register 24.

Figure 2:
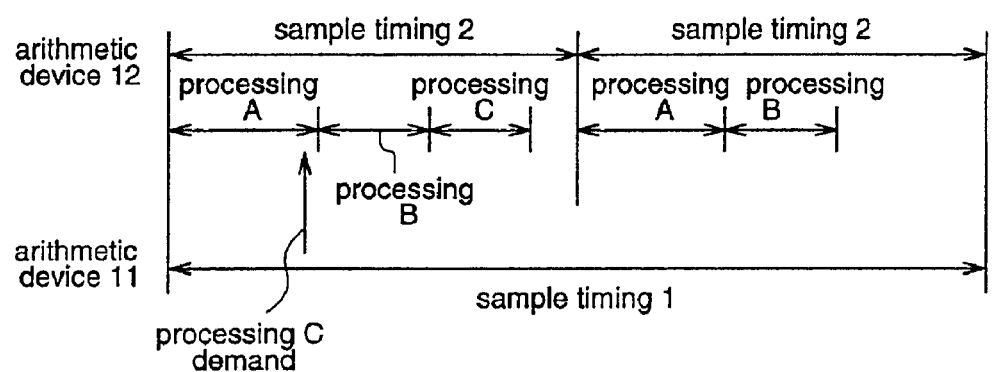
FIG. 2 is a timing chart of the digital signal processor which is provided with the reservation processing register according to the first embodiment.

According to the so-constructed digital signal processor of this first embodiment, the arithmetic device 12 is able to receive the task processing demand outputted from the arithmetic device 11 without making the arithmetic device 11 in a waiting state, and to perform the demanded task after the arithmetic device 12 terminates the task which is under execution. For example, as shown in the timing chart in FIG. 2, when the processing C execution demand is generated at the arithmetic device 11 while the arithmetic device 12 is performing the processing A, in the conventional digital signal processor, the arithmetic device 11 had to wait with monitoring the termination status storage register 24 until the arithmetic device 12 terminates the processing A and the processing B. However, according to the digital signal processor of the present invention, the arithmetic device 11 can perform the processing C only by writing the address of the processing C into the address part of the reservation processing register 26 as well as writing "1" indicating capability of execution into the execution mode in the reservation processing register 26.

Further, since the digital signal processor of this first embodiment includes additionally the clear circuit 27 which detects that the address in the reservation processing register 26 is copied to the program counter 21 and sets "0" meaning incapability of execution to the execution mode in the reservation processing register 26, it is possible to perform the processing C, for which the processing is demanded from the arithmetic device 11, only once. For example, as shown in the timing chart in FIG. 2, if the address and the execution mode of the processing C are added to the task list 18 when the processing C execution demand is generated at the arithmetic device 11 while the arithmetic device 12 is performing the processing A, the processing C will be undesirably performed twice during the sample timing 1 of the arithmetic device 11 because the sample timing 2 of the arithmetic device 12 is operating at a period twice as that of the sample timing 1 of the arithmetic device 11. More specifically, it is assumed that the processings for the focus control and the tracking control are performed in the arithmetic device 12 at a period of 360 KHz, while the processings for the spindle control, the traverse control, and the like are performed in the arithmetic device 11 at a period of 180 KHz. Here, it is supposed that a part of the processing for the spindle control needs to be performed in the arithmetic device 12 once for every two periods of the arithmetic device 11, i.e., at a period of 90 KHz. In such case, by employing the reservation processing register 26, the arithmetic device 11 can demand the arithmetic device 12 to perform the processing so that only a part of the processing for the spindle control may be performed once without a waiting time.

(Embodiment 2)

Figure 3:
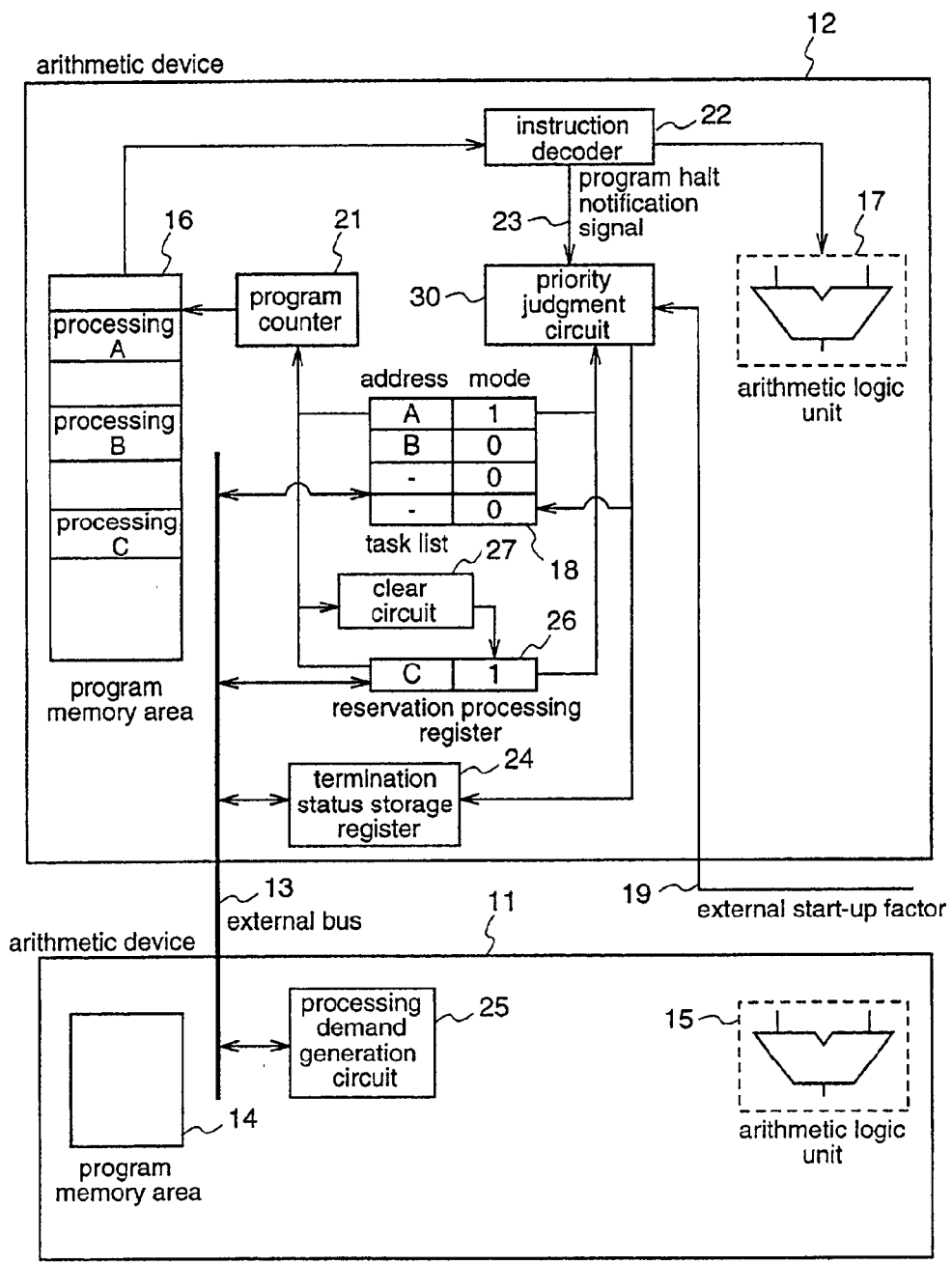
FIG. 3 is a block diagram illustrating the construction of a digital signal processor which is provided with a priority judgment circuit according to a second embodiment of the present invention.

FIG. 3 is a block diagram illustrating the construction of a digital signal processor according to a second embodiment. In FIG. 3, reference numerals 11 and 12 denote arithmetic devices, numeral 13 denotes an external bus, numerals 14 and 16 denote program memory areas, numerals 15 and 17 denote arithmetic logic units, numeral 18 denotes a task list, numeral 19 denotes an external start-up factor, numeral 21 denotes a program counter, numeral 22 denotes an instruction decoder, numeral 23 denotes a program halt notification signal, numeral 24 denotes a termination status storage register, numeral 25 denotes a processing demand generation circuit, numeral 26 denotes a reservation processing register, and numeral 27 denotes a clear circuit. The structure is almost similar to that in FIG. 1 of the first embodiment. A difference from the structure in FIG. 1 of the first embodiment is that a priority judgment circuit 30 is added in place of the processing pointer 20.

When the program counter 21 reaches the termination address of the processing and the program halt instruction is inputted to the instruction decoder 22, the priority judgment circuit 30 receives the program halt notification signal 23 from the instruction decoder 22. At this time, while the processing pointer 20 in the fist embodiment increments the indication destination to the task list 18 by 1 to judge whether the execution mode of a new indication destination indicates capability of execution or not, the priority judgment circuit 30 compares the value of the execution mode of a new indication destination, which is the result of incrementing the indication destination to the task list 18 by 1, with the value of the execution mode in the reservation processing register 26, and copies the processing which has a larger value to the program counter 21. Here, the meanings of the execution modes in the task list 18 and in the reservation processing register 26 here are extended from the meaning in the first embodiment. That is, in the fist embodiment, the execution mode of "0" means incapability of execution and the execution mode of "1" means capability of execution. However, in the second embodiment, the execution mode of "0" means incapability of execution and the execution modes of "1" and more mean capability of execution, and further, the value itself means the degree of priority. The larger the value is, the higher the degree of priority is, which means the corresponding processing is performed first. For example, provided that the bit of the execution mode is 2 bits, three kinds of the degree of priority, i.e., 1, 2, and 3 can be specified.

Figure 4:
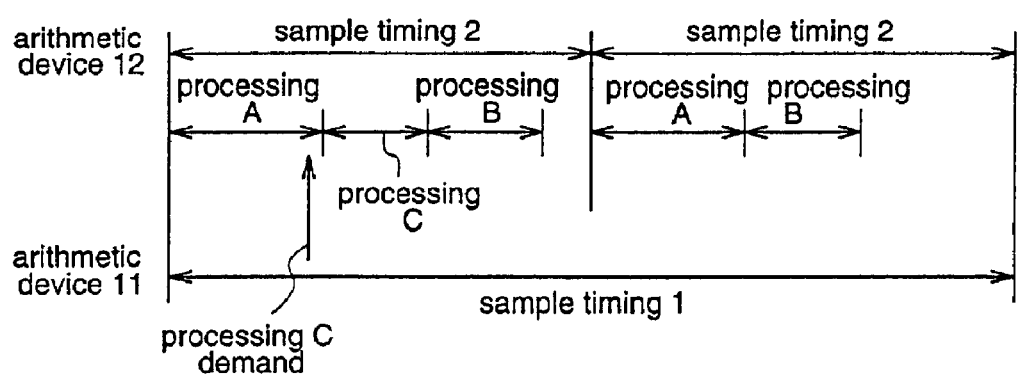
FIG. 4 is a timing chart of the digital signal processor provided with the priority judgment circuit according to the second embodiment.

According to the so-constructed digital signal processor of this second embodiment, the arithmetic device 12 is able to receive the task processing demand outputted from the arithmetic device 11 without making the arithmetic device 11 in a waiting state, and to perform the demanded task after the arithmetic device 12 terminates the task which is under execution. For example, as shown in the timing chart in FIG. 4, when the processing C execution demand is generated at the arithmetic device 11 while the arithmetic device 12 is performing the processing A, in the conventional digital signal processor, the arithmetic device 11 had to wait with monitoring the termination status storage register 24 until the arithmetic device 12 terminates the processing A and the processing B. However, according to the digital signal processor of the present invention, the arithmetic device 11 can perform the processing C only by writing the address of the processing C into the address part of the reservation processing register 26 as well as writing "1" indicating capability of execution into,the execution mode in the reservation processing register 26.

Further, according to the digital signal processor of the second embodiment, by writing the address of a processing having a higher degree of priority than that of the processing which is scheduled to be performed after the termination of the processing which is under execution into the reservation processing register 26 of the arithmetic device 12 from the arithmetic device 11, the execution of the reserved processing can be made faster.

(Embodiment 3)

Figure 5:
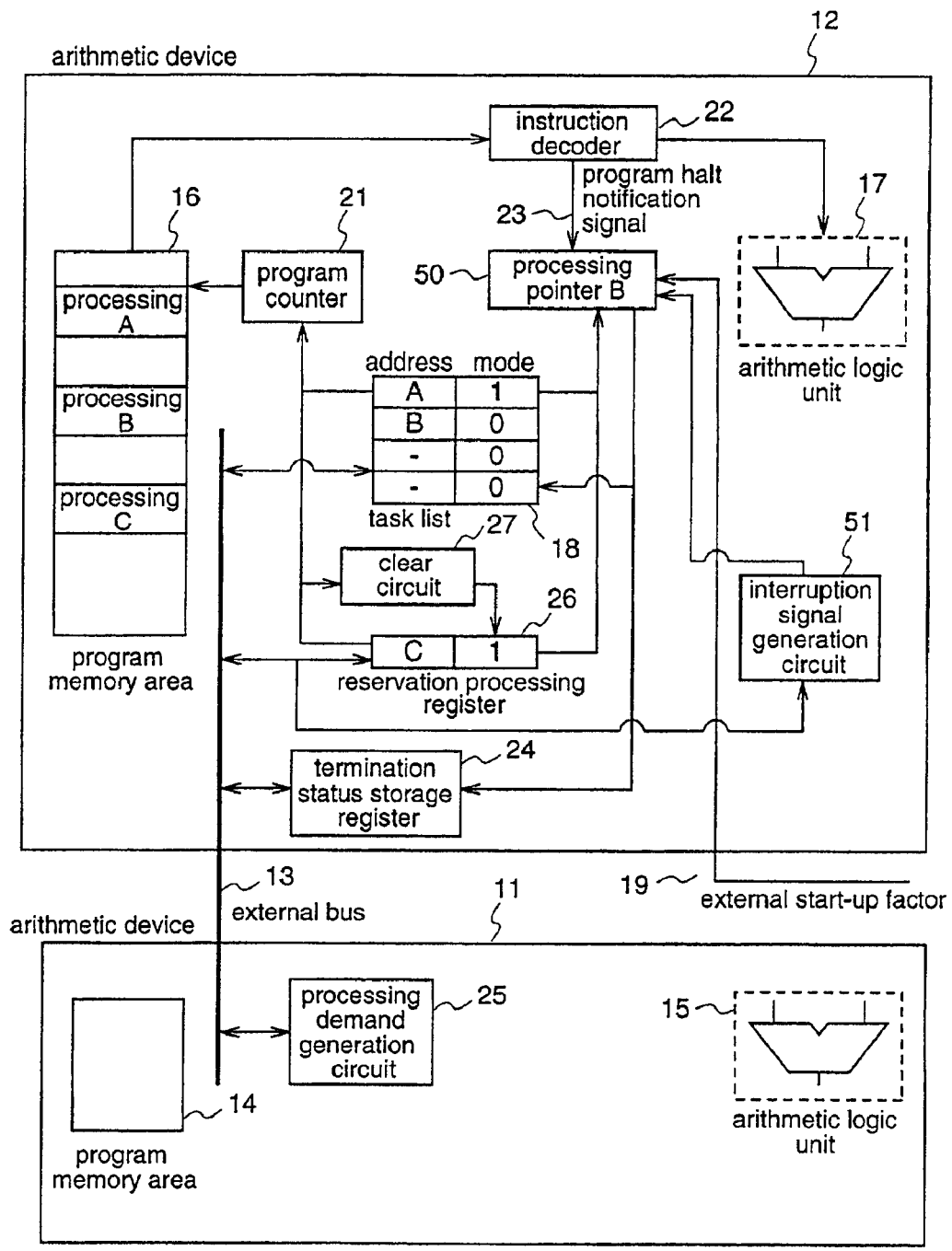
FIG. 5 is a block diagram illustrating the construction of a digital signal processor provided with a processing interruption circuit according to a third embodiment of the present invention.

FIG. 5 is a block diagram illustrating the construction of a digital signal processor according to a third embodiment. In FIG. 5, reference numerals 11 and 12 denote arithmetic devices, numeral 13 denotes an external bus, numerals 14 and 16 denote program memory areas, numerals 15 and 17 denote arithmetic logic units, numeral 18 denotes a task list, numeral 19 denotes an external start-up factor, numeral 21 denotes a program counter, numeral 22 denotes an instruction decoder, numeral 23 denotes a program halt notification signal, numeral 24 denotes a termination status storage register, numeral 25 denotes a processing demand generation circuit, numeral 26 denotes a reservation processing register, numeral 27 denotes a clear circuit, numeral 50 denotes a processing pointer B, and numeral 51 denotes an interrupt signal generation circuit. The structure is almost similar to that in FIG. 1 of the first embodiment. Differences from the structure in FIG. 1 of the first embodiment is that the processing pointer B 50 is provided in place of the processing pointer 20 and that the interruption signal generation circuit 51 is newly added.

The interrupt signal generation circuit 51 monitors whether writing into the reservation processing register 26 is performed from the arithmetic device 11 via the external bus 13 or not, and when detecting writing into the reserved processing register 26 is detected it notifies the interrupt signal to the processing pointer B 50.

In a case where the interruption signal is notified from the interruption signal generation circuit 51, when the program counter 21 reaches the termination address of the processing and the program halt instruction is inputted to the instruction decoder 22, the processing pointer B 50 receives the program halt notification signal 23 from the instruction decoder 22. Then, the processing pointer B 50 increments the indication destination to the task list 18 by 1, and judges whether the execution mode of a new indication destination is capable of being executed or not, and when it is judged capable of being executed, it copies the address of the task list 18 to the program counter 21.

Meanwhile, when the interruption signal is notified from the interrupt signal generation circuit 51, the processing pointer B 50 copies the address in the reservation processing register 26 to the program counter 21. Then, since change the indication destination to the task list 18 is not changed, the arithmetic device 12 performs the processing demanded from the arithmetic device 11, and when the program halt notification signal 23 is notified from the instruction decoder 22, the processing pointer B 50 increments the indication destination to the task list 18 by 1, and judges whether the execution mode of the new indication destination is capable of being executed or not, and when it is judged to be capable of being executed, it copies the address in the task list 18 to the program counter 21.

Figure 6:
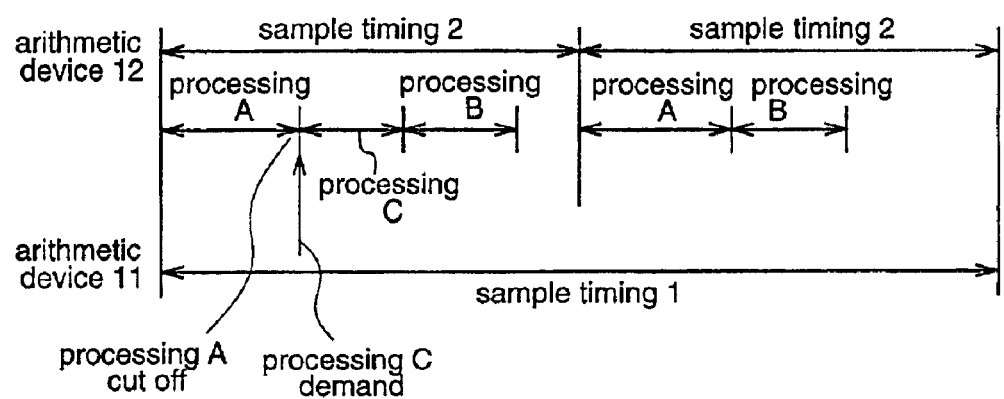
FIG. 6 is a timing chart of the digital signal processor provided with the processing interruption circuit according to the third embodiment.

According to the so-constructed digital signal processor of this third embodiment, when the arithmetic device 12 receives the task processing demand outputted from the arithmetic device 11 it interrupts the processing of the task which is under execution, and performs processing of the demanded task. For example, as shown in the timing chart in FIG. 6, when the processing C execution demand is generated at the arithmetic device 11 while the arithmetic device 12 is performing the processing A, in the conventional digital signal processor, the arithmetic device 11 had to wait with monitoring the termination status storage register 24 until the arithmetic device 12 terminates the processing A and the processing B. However, according to the digital signal processor of the present invention, the arithmetic device 11 can perform the processing C only by writing the address of the processing C into the address part of the reservation processing register 26 as well as writing "1" indicating capability of execution into the execution mode of the reserved processing register 26.

Further, according to the digital signal processor of the third embodiment, the processing A which is under execution in the arithmetic device 12 is interrupted by the arithmetic device 11, thereby it is possible to perform the processing C demanded from the arithmetic device 11. At this time, since the processing pointer B 50 does not change the indication destination to the task list 18, the arithmetic device 12 performs the processing B after the execution of the processing C.

APPLICABILITY IN INDUSTRY

As described above, according to the digital signal processor the present invention, the digital signal processor is outputted the task processing demand from the main arithmetic device to the auxiliary arithmetic device and is received in the auxiliary arithmetic device without making the main arithmetic device in a waiting state, thereby it is possible to perform the demanded task after the task that is under execution in the auxiliary arithmetic device is terminated and, more particularly, the digital signal processor is suitable for the arithmetic processing for the servo control in the optical disk apparatus.

What is claimed is:
1. A digital signal processor comprising:
   a main arithmetic device operable to generate a task demand; and
   an auxiliary arithmetic device operable to receive the task demand from said main arithmetic device and to perform a demanded task, which corresponds to the task demand,
   wherein said auxiliary arithmetic device comprises a program memory area having a task list stored therein a reservation processing register and a clear circuit,
   wherein said program memory area includes previously stored therein, a plurality of tasks that are to be processed by said auxiliary arithmetic device in a prescribed cycle, and an interrupt task which is to be executed in accordance with the task demand,
   wherein said task list defines an order in which the plurality of tasks stored in said program memory area are to be processed by said auxiliary arithmetic device,
   wherein said reservation processing register is operable to set the task demand from said main arithmetic device even when said auxiliary arithmetic device is processing the plurality of tasks,
   wherein said clear circuit is operable to clear the task demand in said reservation processing register after the interrupt task corresponding to the task demand set in said reservation processing register is executed, and
   wherein said auxiliary arithmetic device is operable to execute the interrupt task corresponding to the task demand from said main arithmetic device only once, after terminating processing of one of the plurality of tasks.
2. The digital signal processor as defined in claim 1, wherein
   said auxiliary arithmetic device has a priority judgment circuit operable to determine a priority for performing the processing of the demanded task, to execute the processing, and
   said auxiliary arithmetic device is operable to perform the demanded task in accordance with the priorities of respective tasks determined by said priority judgment circuit.
3. The digital signal processor as defined in claim 1, wherein
   said auxiliary arithmetic device has an interruption signal generation circuit operable to generate an interruption signal interrupting processing which is under execution, and
   when receiving the task demand from said main arithmetic device, said auxiliary arithmetic device interrupts the processing which is under execution and performs the demanded task.

* * * * *